3,288,890
FLUORINE-CONTAINING ORGANIC COMPOUNDS
OF PHOSPHORUS
Edward S. Blake, Dayton, David R. Dalton, Columbus, and Ralph E. De Brunner, Dayton, Ohio, assignors to Monsanto Research Corporation, St. Louis, Mo., a corporation of Delaware
No Drawing. Filed Mar. 26, 1963, Ser. No. 267,913
5 Claims. (Cl. 260—955)

This invention relates to fluorine-containing organic compounds of phosphorus and more particularly provides certain new and valuable fluorine-containing phosphonates and the method of preparing the same. The invention also provides functional fluid compositions comprising some of the new compounds, and methods of actuating a power-transmitting device wherein said compositions are employed.

According to the invention, the presently provided fluorine-containing phosphonates are prepared by the reaction of a hydrocarbylphosphonic dihalide with a (trifluoromethyl)phenol, substantially according to the scheme:

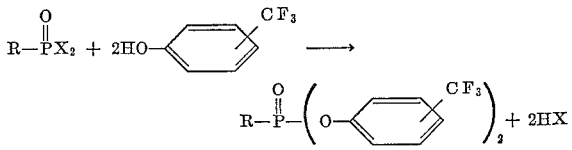

wherein R is hydrocarbyl of from 1 to 12 carbon atoms and is free of olefinic and acetylenic unsaturation, and X is halogen.

The presently useful hydrocarbylphosphonic dihalides include, e.g., alkyl, aryl, aralkyl, cycloalkyl, arylcycloalkyl, alkaryl or alkylcycloalkyl phosphonic dichlorides, dibromides, difluorides, diiodides, chloride iodides, bromide chlorides, etc. The phenol reactant may have the trifluoromethyl radical present at the ortho, meta or para-position. The presently provided phosphonates may be generally referred to as bis[(trifluoromethyl)phenyl]hydrocarbylphosphonates.

Examples of alkylphosphonates prepared according to the invention are the bis[2-, 3- or 4-(trifluoromethyl)-phenyl]methylphosphonates which are obtained from the 2-, 3- or 4-(trifluoromethyl)phenols and methylphosphonic dichloride or diiodide; the bis[2-, 3- or 4-(trifluoromethyl)phenyl]ethylphosphonates which are prepared from one of said phenols and ethylphosphonic dibromide or dichloride; the bis[2,3- or 4-(trifluoromethyl)phenyl]-propylphosphonate which is formed from one of said phenols and propylphosphonic dichloride or difluoride; the bis[2,3- or 4-(trifluoromethyl)phenyl]pentylphosphonate which is obtained from one of said phenols and pentylphosphonic dibromide or dichloride; the bis[2-, 3-, or 4-(trifluoromethyl)phenyl]2-ethylhexylphosphonate which is prepared from one of said phenols and 2-ethylhexylphosphonic dichloride or diiodide, the bis[2-, 3- or 4-(trifluoromethyl)phenyl]nonylphosphonate which is obtained from one of said phenols and nonylphosphonic dichloride or dibromide; and the bis[2-, 3- or 4-(trifluoromethyl)phenyl]dodecylphosphonate which is prepared from one of said phenols and dodecylphosphonic dichloride or dibromide.

The arylphosphonates which are provided by the invention include the bis[2-, 3- or 4-(trifluoromethyl)phenyl]-phenylphosphonates or α- or β-naphthylphosphonates or 2-, 3- or 4-biphenylylphosphonates. The arylphosphonates may or may not have one or more alkyl substituents attached to the aromatic nucleus; i.e., the invention provides the bis[2-, 3- or 4-(trifluoromethyl)phenyl esters of such alkarylphosphonic acids or 2-, 3- or 4-tolylphosphonic acid, 2-, 3- or 4-ethylphenylphosphonic acid, 2,3- or 3,4-dimethylphenylphosphonic acid, pentamethylphenyl-2-, 3- or 4-hexylphenylphosphonic acid, etc. Such arylphosphonates are readily prepared by reaction of the appropriate (trifluoromethyl)phenol with the appropriate aryl- or alkarylphosphonic dichloride, dibromide, difluoride, diiodide or mixed dihalide.

Araylkyl phosphonates provided by the invention include the bis[2-, 3- or 4-(trifluoromethyl)phenyl]esters of such aryl-substituted alkylphosphonic acids as benzylphosphonic acid, 2-phenylethylphosphonic acid or β-naphthylmethylphosphonic acid.

Alicyclic phosphonates provided by the invention may be mono- or poly-cyclic and they may or may not have present as substituent on the alicyclic nucleus one or more alkyls, or an aryl radical; e.g., they include the bis[2-, 3- or 4-(trifluoromethyl)phenyl]cyclopropyl-, cyclopentyl-, cyclohexyl-, 2-methylcyclohexyl-, 4-cyclohexylphenyl-, 2-acenaphthenyl, 9-fluorenyl, or tetrahydronaphthylphosphonate.

Reaction of the hydrocarbylphosphonic acid dihalides with the (trifluoromethyl)phenol takes place by simply contacting the dihalide with the phenol at ambient temperature or with heating. In some instances, reaction rate is accelerated by heating and, particularly when working with the higher molecular weight dihalides, temperatures of from, say, 50° C. to below the decomposition temperature of either the reactants or the ester product are employed. With the lower dihalides the reaction may be slightly exothermic so that for smooth reaction, extraneous cooling may be desirable. Generally, depending upon the nature of the individual reactants, temperatures of from, say, 0° C. to 150° C., and preferably of from, about 15° C. to 125° C. are useful.

The reaction may or may not be conducted in the presence of an inert, organic liquid diluent or solvent, e.g., a halogenated alkane such as chloroform, carbon tetrachloride or ethylene chloride, an ether such as ethyl ether, dioxane, diethylene glycol dimethyl ether, an amide such as dimethylformamide or dimethylacetamide, a ketone such as acetone or 2-propanone, etc.

A catalyst may or may not be used. Operation in the presence of a basic agent is recommended, since the latter serves as scavenger for the by-product hydrogen halide. The basic agent may be inorganic or organic, e.g., it may be a tertiary alkylamine such as triethylamine or tributylamine; a heterocyclic nitrogen base such as N-methylmorpholine or pyridine; an alkali or alkaline earth metal oxide or the basic salt thereof such as sodium, potassium, lithium, calcium or magnesium oxide, carbonate or acetate, etc.

All of the reaction conditions, i.e., whether or not a diluent and/or a basic agent is employed and the nature of the diluent or of said agent if it is used, temperature, pressure, reaction time, reactant proportions, etc., can be readily arrived at by easy experimentation. Thus, arrival at optimum reaction conditions is simply a matter of routine procedure by one skilled in the art. Reaction is generally rapid and is usually evidenced by evolution of hydrogen halide if no scavenger is used. When an organic amine is employed as scavenger, reaction is frequently evidenced by copious precipitation of the amine hydrohalide. To assure complete reaction in experimental runs, it is generally recommended that after initial reaction has appeared to subside, the reaction mixture be allowed to stand at room temperature for a time before working up the product or that the temperature of the reaction mixture be increased after sufficient time has elapsed for any exothermic reaction to have occurred.

As has already been pointed out, formation of the presently provided bis[(trifluoromethyl)phenyl]hydrocarbylphosphonates takes place by condensation of one mole of the hydrocarbylphosphonic dihalide with two moles of the (trifluoromethyl)phenol. Hence the reactants are advantageously employed in such stoichiometric proportions. However, an excess of the phenol may be employed, and such excess is recommended when it is desired to assure complete reaction of a comparatively more difficultly available hydrocarbylphosphonic dihalide reactant. Any excess reactant is readily recovered from the final reaction mixture, e.g., by distillation. When a basic scavenger is used, the bis[(trifluoromethyl)phenyl]hydrocarbylphosphonate is conveniently isolated from the reaction mixture by first removing the hydrohalide by-product, e.g., through water-washing, and then fractionally distilling the residual organic phase in order to remove any unreacted reactant, organic base, diluent, etc., that may be present. When operating in the absence of a base, it is advantageous, in order to obtain optimum yields, to provide for mechanical removal of the by-product hydrogen halide, e.g. by vigorous agitation of the reaction mixture, dephlegmation, etc.

The presently provided bis[(trifluoromethyl)phenyl]hydrocarbylphosphonates are stable, well characterized materials which range from thinly fluid liquids to waxy and resinous solids. They are generally useful as heat-resistant, flame-proofing plasticizers for synthetic resins and plastics, e.g., for polyvinyl chloride, vinyl chloride-vinyl acetate copolymer, polyvinylidene chloride, etc. Those of the present hydrocarbylphosphonates wherein the trifluoromethyl radical is present at the phenyl group in the meta or ortho-position, and wherein the hydrocarbyl radical is phenyl or is a lower alkyl radical, say, of from 1 to 6 carbon atoms, are of particular interest for use as functional fluids, since they are generally liquid over wide temperature ranges, possess high flash points and high ignition points, and are characterized by very good thermal stability. Some of these compounds remain liquid at temperatures which may be as low as, say −50° F., and they remain liquid at temperatures which are substantially higher than 400° F. Hence they are eminently suited for use as hydraulic fluids, especially in hydraulic systems which are subjected to widely varying temperature conditions. Such presently provided bis[(trifluoromethyl)phenyl]hydrocarbylphosphonates possess good viscosity/temperature relationships and are also useful, e.g., as heat-exchange media, gyro fluids, and lubricants.

The invention is further illustrated by, but not limited to, the following examples:

*Example 1*

To 8.7 g. (0.05 mole) of n-butylphosphonic dichloride there were added, with cooling and stirring, 50 cc. of pyridine and then 16.2 g. (0.1 mole) of m-(trifluoromethyl)phenol. The whole was then stirred at room temperature for about 5 minutes, by which time precipitation had occurred. Subsequently, the reaction mixture was allowed to stand overnight, without stirring. It was then poured, with stirring, into an ice-hydrochloric acid mixture and allowed to stratify in a separatory funnel. The aqueous layer was extracted three times with chloroform, and the extracts were combined and washed consecutively with 5% aqueous potassium hydroxide, 6 N hydrochloric acid, said potassium hydroxide again, and finally with water. After drying by filtration, the chloroform was removed by aspirator vacuum and the residue was distilled to give 13.1 g. of the substantially pure, oily, bis[3-(trifluoromethyl)phenyl]n-butylphosphonate, B.P. 113–118° C./0.05–0.06 mm., $n_D^{25}$ 1.4656. Nuclear magnetic resonance analysis gave the following results:

$P^{31}$ resonance at −26.6 p.p.m. (from $H_3PO_4$; consistent with phosphonate structure)

$F^{19}$ resonance at −16.4 p.p.m. (from $CF_3COOH$; consistent with $CF_3$-aromatic carbon structure)

$H^1$ resonance at 7.9 p.p.m. (aromatic hydrogen) and 1.1–2.4 p.p.m. (aliphatic hydrogen)

Integrated areas are in accord with the proposed structure.

Infrared analysis of the compound gave the following data:

Aromatic proton at 3.28µ
Aliphatic protons at 3.41 and 3.52µ
Aromatic oxygen-phosphorus at 9.20 and 9.41µ
Semipolar phosphorus oxygen at 7.60 and/or 7.90µ
Trifluoromethyl at 8.42–8.62µ.

Testing of the bis[3-(trifluoromethyl)phenyl]n-butylphosphonate for efficacy as a functional fluid was conducted by determining such characteristics as kinematic viscosity, pour point, flash point, and autogenous ignition temperature.

Kinematic viscosity, determined by ASTM D445–T 1960 procedure using standard ASTM kinematic viscosity thermometers calibrated against National Bureau of Standards resistance thermometers was found to be as follows:

| Temp. ° F.: | Viscosity, cs. |
|---|---|
| 25 | 128.4 |
| 100 | 10.77 |
| 150 | 4.5 |
| 210 | 2.20 |

The ASTM slope for the 100° F.–210° F. range was found to be 0.96.

The pour point, determined by ASTM D97–57 procedure, was found to be −50° F.

The flash point, determined by ASTM D92–57 procedure, was found to be 437° F.

The autogenous ignition temperature, measured by ASTM procedure D–60T, was found to be 1070° F.

*Example 2*

Operating as in Example 1, m-(trifluoromethyl)phenol was reacted with phenylphosphonic dichloride instead of with butylphosphonic dichloride. There was thus obtained the substantially pure, oily, bis[3-(trifluoromethyl)phenyl]phenylphosphonate, B.P. 144–147°/0.05 mm., $n_D^{25}$ 1.5052, and having nuclear magnetic resonance chemical shifts as follows:

$P^{31}$ resonance at −12.1 p.p.m. (from $H_3PO_4$; consistent with phosphonate structure)

$F^{19}$ resonance at −16.3 p.p.m. (from $CF_3COOH$; consistent with $CF_3$-aromatic carbon structure)

$H^1$ resonance at 8.3–7.42 and 7.39 p.p.m. (from tetramethylsilane; consistent with aromatic protons)

Integrated areas are in accord with the proposed structure.

Infrared analysis of the compound gave the following data:

Aromatic C-H at 3.28µ
Aromatic phosphorus at 6.95µ
Aromatic oxygen-phosphorus at 9.20µ and 9.41µ
Semipolar phosphorus oxygen at 7.60 and/or 7.90µ
Trifluoromethyl at 8.42–8.62µ.

Testing of the bis[3-(trifluoromethyl)phenyl]phenylphosphonate as in Example 1 gave the following kinematic viscosities:

| Temp. ° F.: | Viscosity, cs. |
|---|---|
| 25 | 1,053 |
| 100 | 21.66 |
| 150 | 7.3 |
| 210 | 3.09 |

The ASTM slope for the 100°–210° F. range was found to be 0.95. The pour point was found to be −15° F., the flash point was found to be 482° F., and the autogenous ignition temperature was found to be 1185° F.

*Example 3*

Operating as in Example 1, but employing ethylphosphonic dichloride instead of butylphosphonic dichloride, there was obtained bis[3-(trifluoromethyl)phenyl]ethylphosphonate, B.P. 101–102° C./0.05 mm., $n_D^{25}$ 1.4665, and having nuclear magnetic resonance chemical shifts as follows:

H[1] resonance at 7.41 (singlet) p.p.m. (from tetramethylsilane), consistent with aromatic protons; and 2.27 (quartet), 1.83 (quartet), 1.50 (triplet) and 1.15 (triplet), from tetramethylsilane, consistent with type of aliphatic protons.

Infrared analysis of the compound gave the following data:

Aromatic proton at 3.28µ
Aliphatic protons at 3.41 and 3.51µ
Aromatic oxygen-phosphorus at 9.20 and 9.41µ
Semipolar phosphorus oxygen at 7.60 and/or 7.90µ
Trifluoromethyl at 8.42–8.62µ.

Testing of the bis[3-(trifluoromethyl)phenyl]ethylphosphonate as in Example 1 gave the following kinematic viscosities:

| Temp. ° F.: | Viscosity, cs. |
|---|---|
| 25 | 105.9 |
| 100 | 9.28 |
| 150 | 4.0 |
| 210 | 2.05 |

The ASTM slope for the 100°–210° F. range was found to be 0.94. The pour point was determined to be −50° F., the flash point was found to be 444° F. and the autogenous ignition temperature was found to be 1205° F.

Operating substantially as above there was also prepared bis(3-trifluoromethylphenyl) 3-phenylpropylphosphonate, B.P. 168° C./0.03 mm., $n_D^{25}$ 1.5024, from 3-phenylpropylphosphonic dichloride and m-(trifluoromethyl)phenol.

The presently provided bis(trifluoromethylphenyl)hydrocarbylphosphonates are characterized by extraordinary thermal stability. They do not support combustion. These non-flammable compounds are therefore of interest not only as flame-proofing agents but also as flame-extinguishing and fire-combatting agents.

What we claim is:
1. A compound of the formula

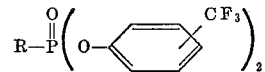

wherein R is hydrocarbyl from 1 to 12 carbon atoms and is free of olefinic and acetylenic unsaturation.
2. Bis[(trifluoromethyl)phenyl]alkylphosphonate having from 1 to 6 carbon atoms in the alkyl.
3. Bis[3-(trifluoromethyl)phenyl]butylphosphonate.
4. Bis[3-(trifluoromethyl)phenyl]ethylphosphonate.
5. Bis[3-(trifluoromethyl)phenyl]phenylphosphonate.

References Cited by the Examiner
UNITED STATES PATENTS

| | | | |
|---|---|---|---|
| 2,342,414 | 2/1944 | Magill | 252—78 |
| 2,566,623 | 9/1951 | Moreton | 252—78 |
| 2,594,454 | 4/1952 | Kosolapoff | 260—461.310 |
| 2,668,843 | 2/1954 | Tolkmith | 260—461.310 |
| 2,668,845 | 2/1954 | Tolkmith | 260—973 X |
| 2,890,235 | 6/1959 | Ralet | 260—955 |
| 3,100,790 | 8/1963 | Oertel et al. | 260—973 X |

CHARLES B. PARKER, *Primary Examiner.*

JULIUS GREENWALD, *Examiner.*

R. D. LOVERING, F. M. SIKORA, *Assistant Examiners.*

---

UNITED STATES PATENT OFFICE
CERTIFICATE OF CORRECTION

Patent No. 3,288,890            November 29, 1966

Edward S. Blake et al.

It is hereby certified that error appears in the above numbered patent requiring correction and that the said Letters Patent should read as corrected below.

Column 2, line 1, after "pentamethylphenyl-" insert -- phosphonic acid, 2-, 3- or 4-butylphenylphosphonic acid, --; line 7, for "Araylkyl" read -- Aralkyl --.

Signed and sealed this 5th day of December 1967.

(SEAL)
Attest:

Edward M. Fletcher, Jr.            EDWARD J. BRENNER

Attesting Officer            Commissioner of Patents